April 9, 1935. T. H. DOAN 1,996,752
TAPPING MACHINE
Filed Feb. 18, 1933 4 Sheets-Sheet 3

Inventor
Theodore H. Doan
By Bates Golrick & Teare
Attorneys

Patented Apr. 9, 1935

1,996,752

UNITED STATES PATENT OFFICE 1,996,752

TAPPING MACHINE

Theodore H. Doan, Cleveland Heights, Ohio, assignor to The Foote Burt Company, Cleveland, Ohio, a corporation of Ohio Application February 18, 1933, Serial No. 657,379

2 Claims. (Cl. 10—105)

This invention is directed to improvements in machine tools, and has for its general object the provision of a positive tool-driving and positive self-feeding head which will function in an accurate and efficient manner in performing tapping operations.

More specifically, my invention is directed to the provision of a compact tool slide and head adapted to carry its own power unit and self-acting to effect reciprocating movement of the unit upon a machine tool frame.

A further object of my invention is the provision of a self-powered tool head, provided with self-feeding mechanism which can be designed into a machine tool in a compact and rugged manner, and which will withstand continuous use over long periods of time without developing inaccuracies in function.

Other objects of my invention will hereinafter become apparent from the following description, which refers to the accompanying drawings, the drawings illustrating a preferred embodiment of the invention. The essential characteristics are summarized in the claims.

Figure 1:
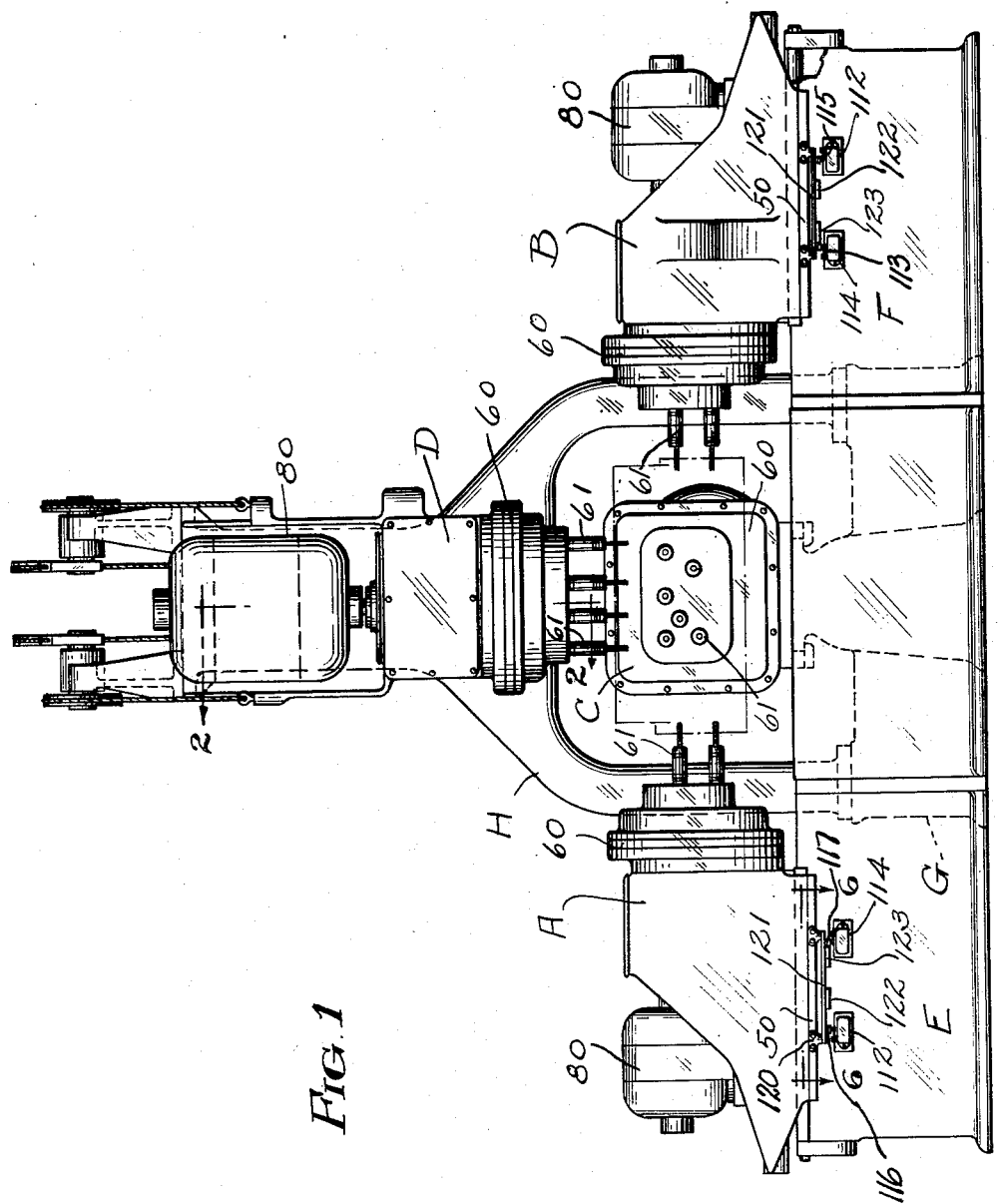
Figure 2:
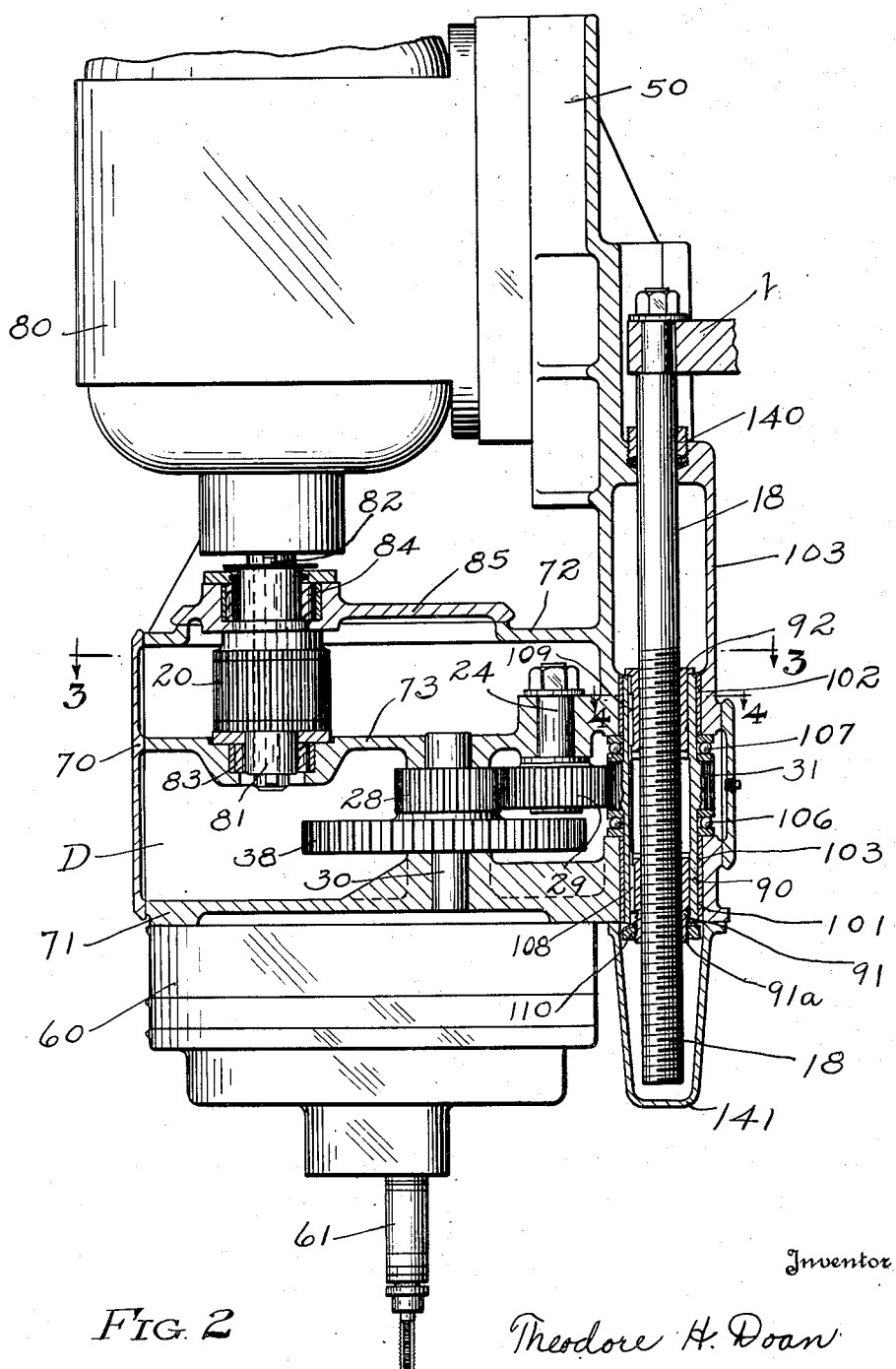
Figure 3:
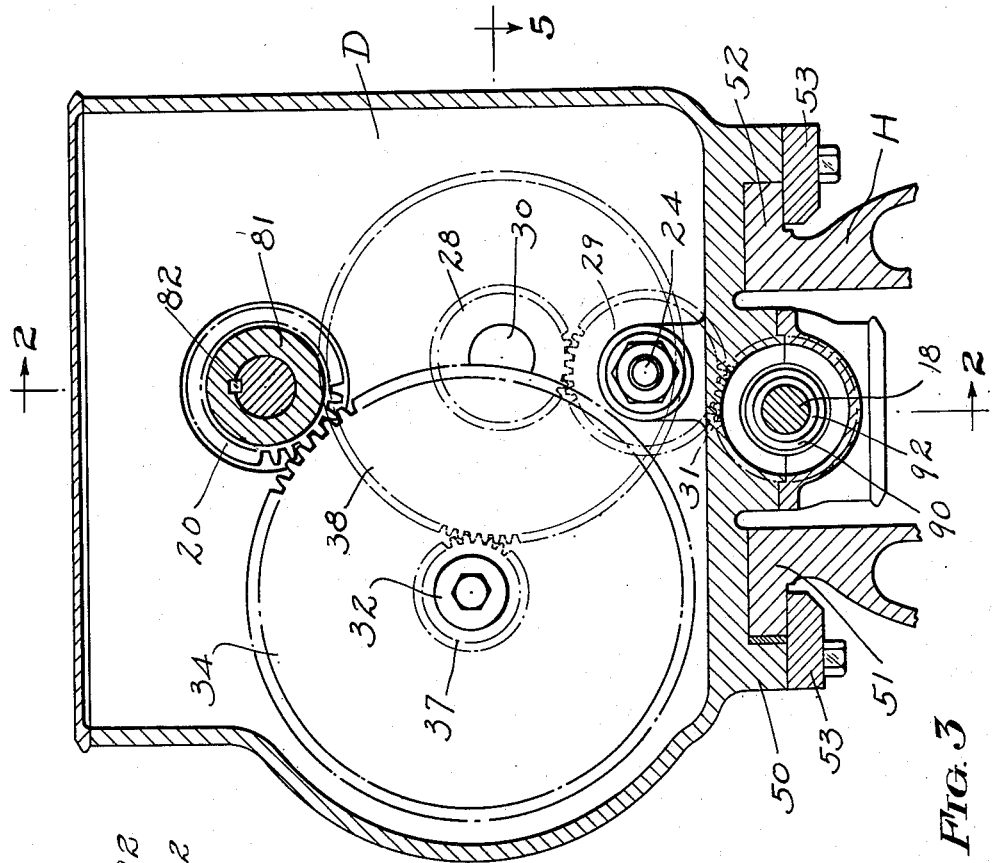
Figure 4:
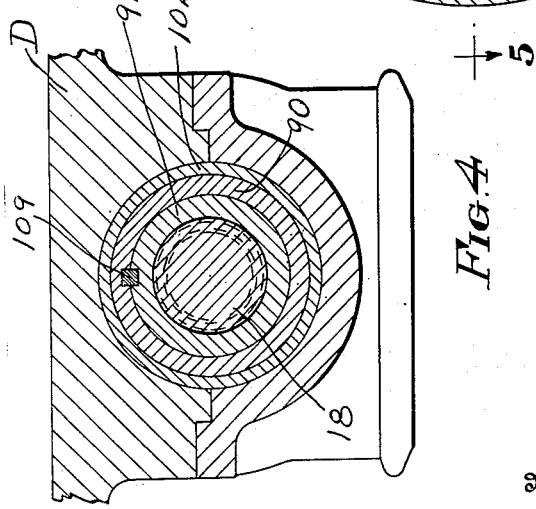
Figure 5:
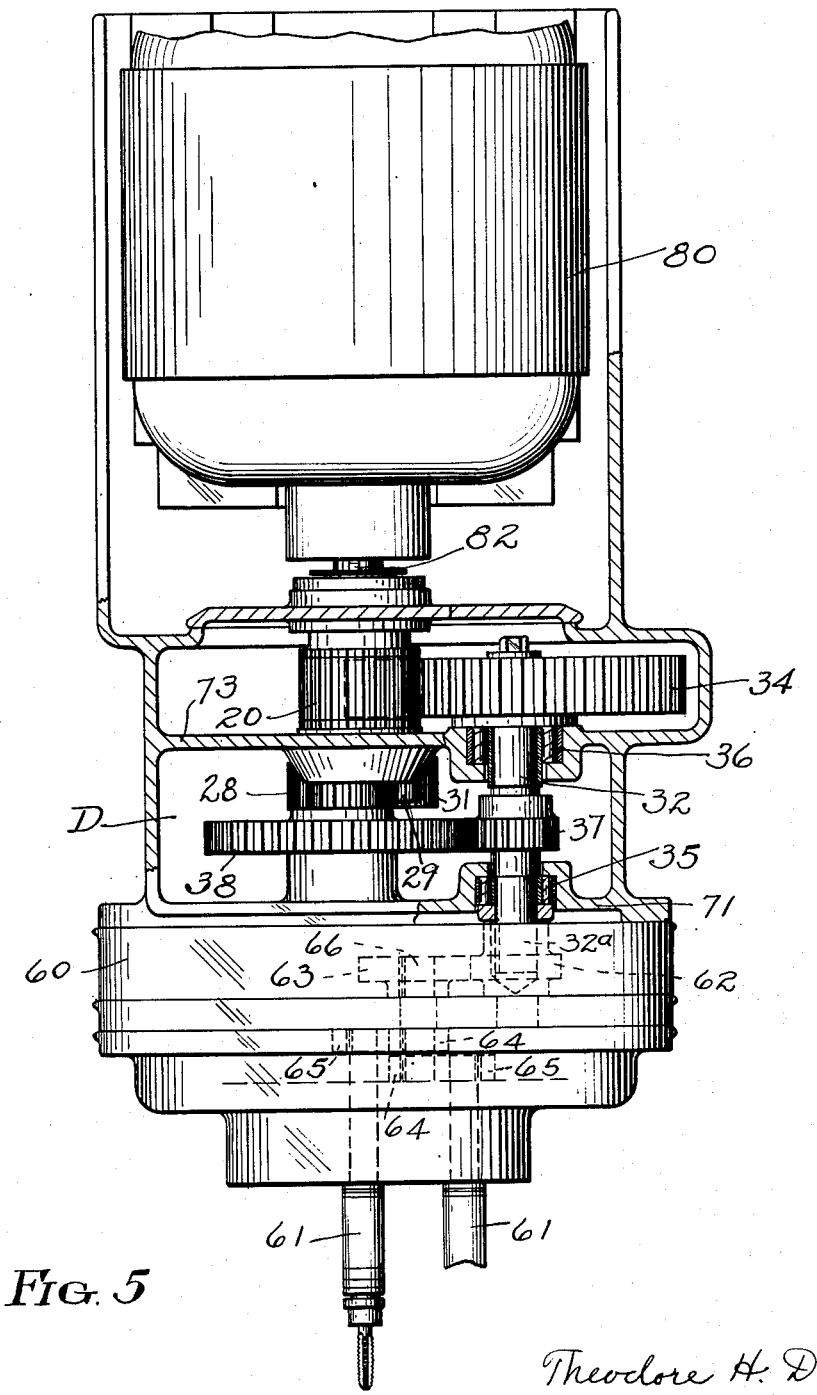

Fig. 1 is a front elevation of a large machine tool, provided with a multiplicity of tool-carrying heads, each of which embodies the features of my invention; Fig. 2 is an irregular cross-sectional view, taken through the head along the plane defined by the line 2—2 in Fig. 1; Fig. 3 is a transverse cross-sectional view, taken through the tool head substantially along the line 3—3 of Fig. 2; Fig. 4 is an enlarged cross-sectional detail, taken through a screw feed mechanism comprising part of my invention and substantially along the line 4—4 of Fig. 2; Fig. 5 is an enlarged cross-sectional view taken through a gear drive comprising part of the tool head mechanism and corresponding substantially to the line 5—5 of Fig. 3.

My invention contemplates the provision of a multiple spindle tool head and slide, having embodied therein a gear reduction mechanism for driving the spindles at any desired speed, a second gear reduction mechanism associated with the first mechanism and serving to impart driving movement to a nut carried by the head. The nut acts upon a stationarily held screw to cause a definite positive movement of the head during a definite number of revolutions of the spindle, the screw being fixed to the machine tool frame. Mounted upon the head slide is a reversible motor, which serves to drive both sets of gear mechanisms and thus effect positive driving of the spindles, as well as the nut, to cause movement of the tool to and from the work or work holding fixture on the machine frame, and I associate this feed mechanism comprising the nut and screw, with the tool head in such manner that the feeding action will always be accurate and any wear upon the screw and nut, incident to constant use of the machine tool, will not introduce inaccuracies in the feeding action of the slide head when the nut is driven by the motor.

Accordingly, in the drawings in Fig. 1, I illustrate the adaptation of my invention to a multiple head tapping machine, and wherein the tool heads A, B, C and D are brought into associated relationship to a workholding fixture mounted on the frame and not shown, the work being outlined in dot and dash lines in Fig. 1. The heads A, B and C are mounted upon base or frame members E, F and G, respectively, to be reciprocably operable upon slideways formed on the upper sides of the base members. While the head D is vertically operable upon a machine frame member H having a vertically disposed slideway upon which the head D reciprocates.

Since my invention may be embodied in a machine tool having only one spindle head, I will hereinafter describe but one spindle head, the associated machine frame therefor, and its control mechanism. In Figs. 2, 3 and 5 of the drawings I show various cross-sections of the head D, which comprises a base portion 50, having a slideway formation for engaging the slide rails 51 and 52, formed on the machine frame member H in spaced apart relation to give ample transverse bearing to the head. Gib members 53 secured to the base 50 of the head serve to maintain the head and the machine frame in slidable engagement. The head comprises, in general, a spindle gear housing and spindle supporting head 60, which carries tap spindles 61, and which may be bolted or secured, in any satisfactory manner, to a gear housing 70, preferably formed to comprise an integral part of the base 50, and a motor 80, secured to the slide base 50 in such position as to have the shaft thereof extending parallel to the axis of the tapping spindle 61. I thereby obtain a compact arrangement of trains of gearings disposed within the gear housing 70, and I am thus able to obtain an efficient mechanical driving of a nut carrying sleeve gear 90, there being a pair of internally threaded sleeve members 91 and 92, within the sleeve gear 90, which are fixed thereto, and which are in engagement with the threads of a stationary screw member 18. The nut sleeve 90 and the screw 18 as shown in Fig. 3, are disposed immediately between the rails 51 and 52, on the machine frame H, whereby the screw is immediately adjacent and in parallelism with the coacting surfaces of the slide formation 50 of the head and the slide rails 51 and 52.

I will now describe the manner of imparting rotating motion to the sleeve 90 from the motor 80. The gear housing 70 is provided with an outer or lower wall 71, an upper or rear wall 72 and an intermediate inner wall 73, between which are disposed the gear trains for imparting motion from the motor gear 20 to the sleeve 90. These walls are joined by integral side webs, whereby a gear housing is afforded comprising part of the slide. The motor gear 20 is not connected upon the motor shaft, but is mounted upon a short shaft 81, which is connected to the motor shaft by a sleeve fit over the shaft and a key 82 completes the connection. An anti-friction bearing 83 is carried by the intermediate wall 73 of the gear housing to support the inner or lower end of the shaft 81. A second anti-friction bearing 84 is carried by a closure plate 85, which may be secured to the housing wall 72 in any suitable manner. Disposed within the space afforded between the gear housing walls 72 and 73 is a large gear 34 meshing with the motor gear 20, to be driven thereby, and the gear 34 is mounted upon a shaft 32. The shaft 32 is suitably supported by anti-friction bearing members 35 and 36, which bearing members are suitably supported by the intermediate gear housing wall 73, and the outer or downward wall 71. The shaft has mounted thereon a pinion 37 which drives a large gear 38, the large gear 38 being mounted upon a short shaft 30, carried by the gear housing walls 70 and 71, and the shaft 30 also has mounted thereon a pinion 28. The pinion 28 drives an intermediate gear 29, which is mounted upon a stud shaft 24. The intermediate gear 29 meshes with the teeth 31 of the sleeve gear 90.

To drive the tap spindles 61 an extension is provided on the gear shaft 32, which projects into the spindle gear housing 60, in a suitable manner to carry the gear member 62. The gear member 62 drives an intermediate gear 63, carried by a short shaft 66, upon the lower end of which is a wide pinion 64, and which meshes with and drives the spindle gears 65. The gear ratios are such that the sleeve nut 90 is rotated four times per inch of movement, while the spindles will be rotated during this inch of movement a number of revolutions, which will equal the pitch of the tap threads. In this manner I obtain a positive drive relation between the spindles and the head.

I will now describe the feed nut mechanism and screw and associated bearing parts in detail. This mechanism is developed in such manner that compensation for wear of the screw threads and the threads of the nut sleeves 91 and 92 can be taken up from time to time so that all back lash between these coacting members will be eliminated, and the mechanism is housed in such manner as to be maintained at all times in a lubricating bath. The sleeve gear 90 is rotatably supported by two plane bearing sleeves 101 and 102, and which are carried by an extension of the slide 50 formed centrally on the bottom thereof. Thrust bearings 106 and 107 disposed on each side of the tooth formation of the gear sleeve 90 serve to maintain the sleeve 90 longitudinally fixed relative to the slide head. The spaced apart internally threaded sleeves or nuts 91 and 92 are angularly fixed relative to the sleeve 90 by key members 108 and 109. The sleeve nut 92 is permanently fixed to the sleeve 90. The sleeve nut 91 is provided with an externally threaded extension 91a, upon which an adjustable collar 110 is placed, and this adjusting collar bears against the outer or lower end of the gear sleeve 90, thus, by adjusting the nut sleeve 91 relative to the gear sleeve 90 and the nut sleeve 92, internal threads of the nut sleeve 91 will bear upon the thread faces of the screw member 18 in a manner opposite to the action of the nut sleeve 92, that is, the nut sleeve 91 will act upon one helical face of the screw thread of the member 18, while the nut sleeve 92 acts upon the opposite face of the screw thread. It will be apparent that this arrangement affords a means of eliminating all back lash between the slide head and the screw member 18.

As shown in Fig. 2, the screw member 18 is completely enclosed throughout its operative length by the housing extension 103 and a packing gland mechanism, shown at 140, serves to maintain lubricant within the screw housing. At the outer end thereof this housing is provided with a removable cap 141, by the removal of which access to the adjusting nut 110 is afforded.

As stated, the motor 80 is a reversing motor for the purpose of reversing the spindle 61 when tapping operation is completed. I have not shown in the drawings in detail any controller reversing switches, but in Figs. 6 and 7 I have shown, in outline, reversing switches 112 and 114. These switches may be of any suitable type to be operated by oscillatable arms 113 and 115, respectively, the arms carrying cam rollers 116 and 117, respectively. The switches may be secured to the machine frame at a convenient location adjacent the path of reciprocating movement of the slide, as shown in Fig. 1, and the slide has fixed to the sides thereof a bracket construction 120, supporting a bar 121 upon which are adjustably mounted cam members 122 and 123. The cam member 122 serves to actuate the roller 116 and consequently the switch 112, while the cam member 123 serves to actuate the roller 117, and consequently the switch 114. Thus, the length of movement of the reciprocating head relative to any work supported by the machine frame can be conveniently predetermined.

Some of the advantages of the foregoing described tool head are to be found in the fact that there is a positive relationship between the number of R. P. M.'s of the tap spindle per inch of movement of the head, thus permitting the use of tap holders or chucks which have but a very limited or restricted floating movement. The head can be compactly and sturdily constructed. A multiple head machine can be equipped with unit heads to simultaneously perform tapping, drilling and boring operations. The weight and size of the head can be readily proportioned, as well as the width of the slideways on the machine frame, to correspond to the amount of work which the tools carried by the spindles are to perform; the unit principle of design of the head is such that the entire mechanism may be removed from the machine frame for repair or replacement without disorganizing any of the cooperating parts comprising the drive for both the feed and the spindles, since the screw can be detached from the machine frame quite conveniently whereby the screw is removed with the head. The screw can be disposed immediately between the slideway rails while being very firmly supported by the machine frame in operative position. The screw and feed nut can be maintained in a bath of lubricant under all operative conditions, whether the head be horizontally or vertically disposed to operate on the machine frame while some of the disadvantages of a reversing motor are overcome by having the motor shaft positively connected to both the spindle drive and the head feed drive and the arrangement of the drive is such as to meet varying conditions incident to the use of taps of different pitches and should any wear take place between the feed nut and the screw, compensation can be made therefor by effecting adjustment of one feed nut relative to the other.

I claim:

1. In a machine tool, the combination of a machine frame, a tool spindle carrying head, comprising a slide mounted to reciprocate upon a machine frame, said head having bearings supporting a tool spindle at the forward end thereof, a motor mounted upon the rear end of the slide, said motor being arranged with the axis thereof parallel to the axis of the spindle, a gear mechanism disposed intermediate the spindle head and the motor, a screw member extending longitudinally of the machine frame intermediate said slide and mounted rigidly upon the machine frame, a pair of spaced feed nuts in engagement with the screw, a pair of spaced bearings formed on the spindle-carrying head adjacent the gearing mechanism to surround the screw, a gear member splined to said nuts and driven by said gearing mechanism, said gear having hub portions disposed between said nuts and said bearings, and means to adjust said nuts axially relative to each other.

2. In a machine tool, the combination of a machine frame, a slide member comprising a tool spindle carrying head, slidably mounted upon the frame to reciprocate thereon, a motor, a gearing mechanism and housing interposed between the motor and the spindle-carrying head, including a gear driven member carried by the housing of said gearing mechanism, a screw rigidly mounted on the machine frame and engaged by said member, said member including a pair of spaced nuts, a gear secured against rotary movement relative to both of said nuts, one of said nuts being capable of axial movement relative to said gear, adjustable means to urge one nut axially toward the other nut and retain such nut in an adjusted position whereby a precision feed is obtained despite irregularities in the screw, due to wear.

THEODORE H. DOAN.